United States Patent
Qin (10) Patent No.: US 7,861,164 B2
(45) Date of Patent: Dec. 28, 2010

(54) METHOD TO SEQUENTIALLY ENCODE PINYIN OF CHINESE CHARACTER WITH FEW SYMBOLS

(75) Inventor: Bin Qin, 177 Brigham Hill Rd., N. Grafton, MA (US) 01536

(73) Assignee: Bin Qin, North Gratton, MA (US)

( * ) Notice: Subject to any disclaimer, the term of this patent is extended or adjusted under 35 U.S.C. 154(b) by 1077 days.

(21) Appl. No.: 11/163,923

(22) Filed: Nov. 3, 2005

(65) Prior Publication Data

US 2006/0061491 A1  Mar. 23, 2006

(51) Int. Cl.
*G06F 17/00* (2006.01)
(52) U.S. Cl. ...................................... 715/264
(58) Field of Classification Search ................ 715/255, 715/261, 264; 345/169
See application file for complete search history.

(56) References Cited

U.S. PATENT DOCUMENTS

| | | | | |
|---|---|---|---|---|
| 5,331,557 A * | 7/1994 | Liu | ........................... | 715/263 |
| 5,360,343 A * | 11/1994 | Tang | ........................... | 434/118 |
| 5,835,924 A * | 11/1998 | Maruyama et al. | ........... | 715/264 |
| 6,005,498 A * | 12/1999 | Yang et al. | ..................... | 341/23 |
| 6,009,444 A * | 12/1999 | Chen | ........................... | 715/263 |
| 6,014,615 A * | 1/2000 | Chen | ............................. | 704/3 |
| 6,163,767 A * | 12/2000 | Tang et al. | ................... | 704/231 |
| 6,587,819 B1 * | 7/2003 | Lu | ............................... | 704/257 |
| 6,636,163 B1 * | 10/2003 | Hsieh | ........................... | 341/28 |
| 6,765,504 B2 * | 7/2004 | Ouyang | ......................... | 341/28 |
| 6,822,585 B1 * | 11/2004 | Ni et al. | ......................... | 341/28 |
| 7,263,658 B2 * | 8/2007 | Chou | ............................ | 715/262 |
| 7,506,254 B2 * | 3/2009 | Franz | ........................... | 715/259 |
| 7,533,014 B2 * | 5/2009 | Mao | ............................... | 704/9 |
| 2002/0135499 A1 * | 9/2002 | Guo | ............................... | 341/23 |
| 2002/0180806 A1 * | 12/2002 | Zhang et al. | ................. | 345/816 |
| 2002/0194001 A1 * | 12/2002 | Sugano | ........................ | 704/270 |
| 2003/0231120 A1 | 12/2003 | Zhang | ........................... | 341/28 |
| 2004/0252035 A1 * | 12/2004 | Chang | .......................... | 341/28 |
| 2005/0044495 A1 * | 2/2005 | Lee et al. | ..................... | 715/533 |
| 2006/0095843 A1 * | 5/2006 | Chou | ........................... | 715/535 |
| 2007/0203692 A1 * | 8/2007 | Fux et al. | ......................... | 704/7 |

OTHER PUBLICATIONS

Cheng et al., Chinese Phonetic Handwritten Text Input for Mobile Phones, ACM 2005, pp. 1-3.*
Hsu et al., Spoken Correction for Chinese Text Entry, Google 2006, pp. 648-659.*

* cited by examiner

*Primary Examiner*—Cong-Lac Huynh (57) ABSTRACT

A method of encoding Chinese character PINYIN into digital string and utilizing a key pad to input Chinese character to computer is described herein. The pronunciation of a Chinese character can be described by Romania form of 26 letters, and four tone indicators. In accordance with the present invention, a lookup table has been composed, allowing the 30 symbols to be grouped into ten sets. Each set is associated with group identification respectively. In operation, a key pad mapped with the lookup table allows individual symbol of PINYIN to be inputted directly using group identification as medium. Individual symbols are retrieved exclusively through the group identification and echoed step by step. A human-machine interface similar to an ASCII compatible keyboard has been established by the method for a small key pad compatible to phone set during the PINYIN inputting process. An inputted PINYIN is used to retrieve a Chinese character further.

4 Claims, 3 Drawing Sheets

| GROUP | Item 1 | Item 2 | Item 3 | CODE |
|---|---|---|---|---|
| SET1 | g | z | a | 1 |
| SET2 | d | b | o | 2 |
| SET3 | y | j | e | 3 |
| SET4 | k | c | i | 4 |
| SET5 | t | p | u | 5 |
| SET6 | w | q | ü | 6 |
| SET7 | h | s | / | 7 |
| SET8 | n | m | v | 8 |
| SET9 | r | x | \ | 9 |
| SET10 | l | f | - | 0 |

| GROUP | Item 1 | Item 2 | Item 3 | CODE |
|---|---|---|---|---|
| SET1 | g | z | a | 1 |
| SET2 | d | b | o | 2 |
| SET3 | y | j | e | 3 |
| SET4 | k | c | i | 4 |
| SET5 | t | p | u | 5 |
| SET6 | w | q | ü | 6 |
| SET7 | h | s | ´ | 7 |
| SET8 | n | m | ˇ | 8 |
| SET9 | r | x | ` | 9 |
| SET10 | l | f | - | 0 |

Figure 1. A lookup table for coding elementary symbols of PINYIN.

Figure 2A. A conventional layout of key face of phone set;
2B. A 4×3 key pad in accordance with the present invention;
2C. Parallel layout of 2B with the classical PINYIN symbols;
2D. Key cap imprinted with label;
2E. Transparent key cap and the embedded display device.

A. Vowel

|  | i{4} | u{5} | ü{6} |
|---|---|---|---|
| a{1, 10} | ia{41} | ua{51} |  |
| o{2, 20} |  | uo{52} |  |
| e{3, 30} | ie{43} |  | üe{63} |
| ai{14, 104} |  | uai{514} |  |
| ao{12, 102} | iao{412} |  |  |
| ei{34, 304} |  | uei{534} |  |
| an{18, 108} | ian{418} | uan{518} | üan{618} |
| ou{25, 205} | iou{425} |  |  |
| en{38, 308} | in{48} | uen{538} | ün{68} |
| ang{181, 1081} | iang{4181} | uang{5181} |  |
| ong{281} | iong{4281} |  |  |
| eng{381, 3081} | ing{481} | ueng{5381} |  |

B. Consonant

| b{2} | p{5} | m{8} | f{0} |
|---|---|---|---|
| d{22} | t{55} | n{88, 8} | l{00} |
| g{11, 1} | k{44} | h{77} |  |
| j{3} | q{6} | x{9} |  |
| zh{177} | ch{477} | sh{777} | r{99} |
| z{1} | c{4} | s{7} | w{66} |
|  |  |  | y{33} |

C. Tone

| - {00} | / {70} | V {80} | \ {90} |
|---|---|---|---|

Figure 3. Digit codes of vowels, consonants and tones of PINYIN in accordance with the present invention.

Figure 4. The flow chart of inputting and echoing process using group identification as medium in accordance with the present invention.

```
ch uang

^^^^^^^             legible PINYIN forms for
                    a digital sequence
4                       {c,k}
47                      {ch}
477                     {ch}
4775                    {chu}
47751                   {chua}
477518                  {chuan}
4775181                 {chuang}

1234567  ⇐ steps to input the group identification
```

Figure 5. Example of sequential coding, inputting and echoing process in accordance with the present invention.

METHOD TO SEQUENTIALLY ENCODE PINYIN OF CHINESE CHARACTER WITH FEW SYMBOLS

FIELD OF THE INVENTION

The present invention relates in general to the information technology field and, in particular, to devices and methods for coding and inputting Chinese character into computer or computer related electric devices through delineating its pronunciation as a sequence of symbols. The coding symbols comprise of a small set with no more than ten elements, and can be conveniently associated to a key pad of phone set. A sequence of symbols in accordance with the present invention can be converted to legible form of Chinese character pronunciation, PINYIN, sequentially and exclusively. Based on the description of pronunciation, a group of characters can be retrieved by the PINYIN method, one of the classical Chinese character input methods. In accordance with the present invention, a key pad compatible to a phone set is used to directly digitalize Chinese character for communication or further process.

The PINYIN method is one of the major techniques in the field of inputting Chinese character into computer with an ASCII compatible keyboard. This method involves a composition-and-commit procedure, since one PINYIN may represent more than one character. During the inputting process, a target character must be selected from a list of candidates that pronunciate the same. The selection might be simplified by a veriety of strategies.

The progress of telecommunication over recent years brings the mobile phone set to compose and submit short message in Chinese context. The key pad of phone set becomes a device to input Chinese character through the PINYIN method, which is complicated by limited number of keys. A key has to be loaded with several elementary units of PINYIN. Before selection of a character at late stage, the input procedure requires choice of a proper PINYIN symbol from several possiblilties retrieved by one or several key press. Accomplishment of PINYIN requires more key actions compared to ASCII compatible keyboard.

Figures 2A, 2B, 2C, 2D, 2E:
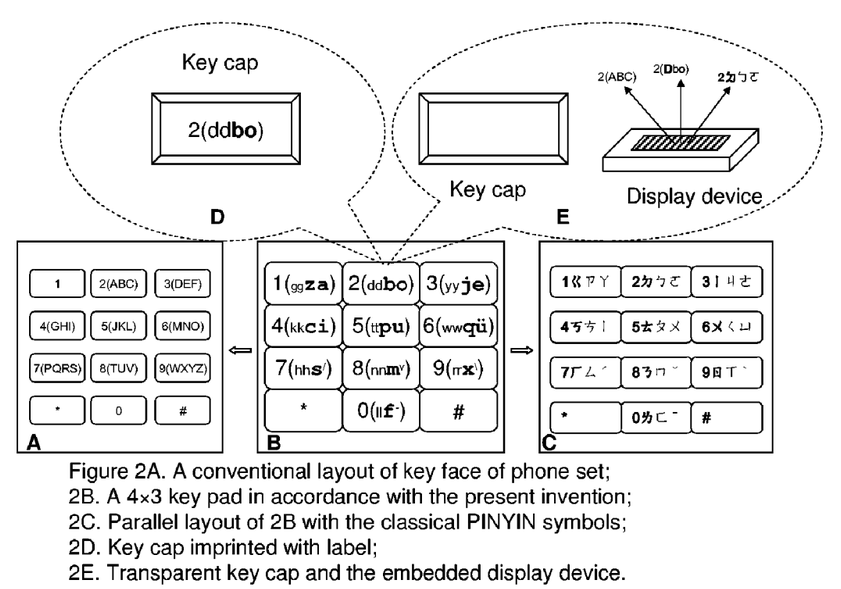
FIG. 2A (PRIOR ART) illustrates a small key pad compatible to phone set, which is utilized to input PINYIN in roman form by conventional method.
FIGS. 2B and 2C illustrate a small key pad for PINYIN method in accordance with the present invention.
FIGS. 2D and 2E illustrate implementations of key cap in accordance with the present invention.

Inputting PINYIN in Romania form is a sequential process which is completed by packing individual letters one by one. As illustrate on FIG. 2A, a small key pad compatible to a telephone set has been described herein. The complexity of the PINYIN technique based on such a key pad is shown by the procedure to construct one of the legible Romania PINYIN forms, "chuang". The input procedure contains 6 major steps:

| Step 1: Press 2 => ABC | | |
|---|---|---|
| Delete B, delete A | obtain | C |
| Step 2: Press 4 => GHI | | |
| Delete I, delete G | obtain | H |
| Step 3: Press 8 => TUV | | |
| Delete V, delete T | obtain | U |
| Step 4: Press 2 => ABC | | |
| Delete C, delete B | obtain | A |
| Step 5: Press 6 => MNO | | |
| Delete O, delete M | obtain | N |
| Step 6: Press 4 => GHI | | |
| Delete I, delete H | obtain | G |

The "CHUANG" is packed at the final step, could be used to index characters whose pronunciation is described by "chuang".

A different method of U.S. Pat. No. 6,765,504, for example, is related to the use of Romanization PINYIN for inputting Chinese characters via numerical keys. In this method, each PINYIN symbol is inputted by single key press. A plurality of combinations of PINYIN symbols will be generated, and several possible PINYIN forms are retrieved for further selection before selection of Chinese character. For example, the key signal combination "736" corresponds to three sets of pinyin symbol combinations, i.e. "pen", "ren", and "sen". An additional key signal is needed to complete the input. Thus, the digit code does not relate to PINYIN form in one by one sense.

Compared to the PINYIN method utilizing an ASCII compatible keyboard, the whole procedure to pack a PINYIN through a small key pad requires more key action. Accordingly, there is and has been a need for a cost effective and user-friendly input method that can be used to directly construct PINYIN unambiguously to retrieve Chinese character by a small key pad compatible to phone set. The devices and the methods of the present invention satisfy this need and other needs.

BRIEF DESCRIPTION OF THE INVENTION

In accordance with the present invention, the elementary symbols of initial consonants and vowels of PINYIN, have been grouped into sub sets. Each set has a unique identification and contains several symbols. Encoding a character's pronunciation means to substitute the elementary symbols of PINYIN sequentially with their group identification. The sequence of Romania letters, one of PINYIN legible forms is converted to a sequence of group identification. Excluding tones, all Chinese characters adopt to 423 basic PINYIN forms, which are fully resolved by the mapped identification sequences in accordance with the present invention. Inclusion of tones for the basic PINYIN forms does not create any ambiguity during the encoding process, allowing more PINYIN forms to be mapped uniquely by the identification sequences.

A lookup table for PINYIN's elementary symbols has been composed and mapped to a small key pad compatible to telephone set. The layout of symbols on key pad allows them taking an order which is consistent to convention in columns or rows. In accordance with the present invention, the coding process for PINYIN is a direct checkup and sequential procedure. While encoding elementary symbols of PINYIN by its group identification, the Romania letters or other symbols, which are used to represent PINYIN, could also be retrieved and echoed sequentially and uniquely during the coding and inputting process. In accordance with the present invention, the required key action to choose PINYIN symbols or PINYIN have been eliminated for the small key pad, allowing direct construction of PINYIN in Romania form or other form.

BRIEF DESCRIPTION OF THE DRAWINGS AND TABLES

A more complete understanding of the present invention may be had by reference to the following detailed description when taken in conjunction with the accompanying drawings and the summarizing tables wherein.

Table 1 summarizes all possible PINYIN forms and corresponding digit sequences which delineate Chinese character pronunciation.

Table 2 summarizes the coding and echoing process with group identification in progress for all legible PINYIN forms in Roman scheme.

Table 3 summarizes the group identification sequences which have legible PINYIN forms in accordance with the present invention.

DETAILED DESCRIPTION OF THE INVENTION

A "PINYIN", as the term is used herein, refers to a sequence of symbols of initial consonant and vowel in defined pattern to represent the pronunciation of a Chinese character. Illustrated on FIG. 3, there are 23 consonants and 35 vowels for 423 legible forms of PINYIN. Each PINYIN may have four different tones. The consonants and vowels could be comprised from basic elements in either Romania form or classic form. There are 20 elementary symbols for initial consonant, 6 elementary symbols for vowels and 4 symbols for tones. According to the Latin-Scheme of PINYIN, as illustrated on FIG. 3, the symbols of PINYIN are ordered in small groups by convention. For initial consonants, these groups are recognized as: {g, k, h}; {j, q, x}; {z, c, s}; {b, p, m, f}; {d, t, n, l} and {y, w, r}. The last three are grouped by convenience. There are only two groups, {a, o, e} and {i, u, ü}, for the elementary vowels. Four tones are in a group: {¯, ´, ˇ, `}.

Figure 1:
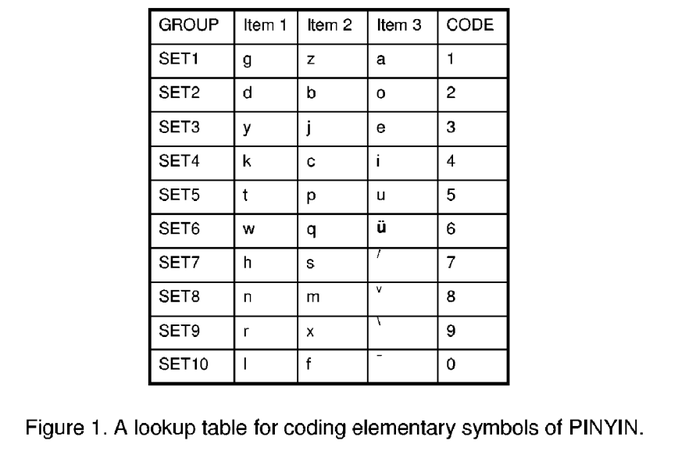
FIG. 1 illustrates the lookup table of elementary symbols of PINYIN in group and the group identification of these symbols in accordance with the present invention.

In accordance with the present invention, one preferred implementation to sub group the 30 elementary symbols of PINYIN is illustrated on FIG. 1. Ten groups, referred as lookup sets, are involved. Each set contains two symbols of consonants and one symbol for either vowel or tone. The symbols in each set are ordered as item 1, 2 and 3, respectively. Set 1 contains "g", "z" and "a". Set 2 contains "d", "b" and "o". Set 3 contains "y", "j" and "e". Set 4 contains "k", "c" and "i". Set 5 contains "t", "p" and "u". Set 6 contains "w", "q" and "ü". Set 7 contains "h", "s" and "´". Set 8 contains "n", "m" and "ˇ". Set 9 contains "r", "x" and "`". Set 10 contains "l", "f" and "¯".

Each item is encoded by its group identification. One preferred implementation to distinguish the initial consonants of same set is to code one of them by repeated group identifications or double digits. Exemplified by coding symbols of set 4, the "k" is presented as 44, while the "c" and "i" are presented as 4. There is another preferred implementation to code "a", "o", and "e" as 10, 20 and 30 respectively to reduce the rate of unresolved digit sequence when they occur as initial symbols in PINYIN.

Figure 3:
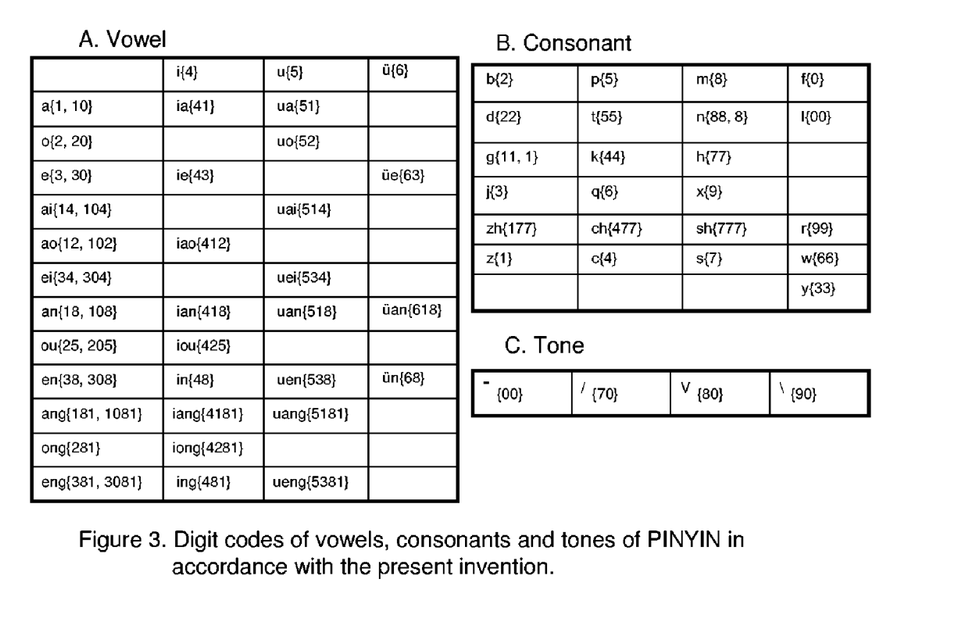
FIG. 3 illustrates a digit PINYIN scheme for initial consonants, vowels and tones, based on the lookup table in accordance with the present invention.

For accuracy of presenting pronunciation, each description of PINYIN in Romania form can be loaded with tone. In accordance with the present invention, one preferred implementation of tone is to put two digits at the end of the digit sequence to represent tone. Illustrated on FIG. 3C, the signs of tones are presented as: `: 90, : 80,´ : 70 and ¯: 00, respectively.

Illustrated on FIGS. 3A & 3B, substituting the elementary symbols of PINYIN into its group identification accordingly, all consonants and vowels are mapped to a digit sequence without ambiguity in accordance with the present invention. The legible forms of PINYIN in Romania form and the mapped digit sequences in accordance with the present invention are summerized in Table 1. There are two forms of PINYIN, "ng" and "na", have been mapped to the same digit sequence "881". The ambiguity is resolved by the fact that the Chinese character set represented by the PINYIN form "ng" is the same as that by the PINYIN form "n", which has a different digit sequence to map. Therefore, the digit sequence "881" be fully devoted to "na".

Encoding the elementary symbols of PINYIN into digit is based on a lookup table and coding rule which have been described in details in previous paragraphs. Since the digit strings in accordance with the present invention have unique relationship to the consonants and vowels of PINYIN and the relationship could be identified directly, the present invention provides an alternative PINYIN scheme based on digits. Thus, the digital strings of many fields, such as telephone number, series number of identification and numerical name of web site, could be associated with meaning of Chinese characters in accordance with the present invention.

Transformation of legible PINYIN form in Latin scheme to digits does not elongate the symbol sequence for vowels and most of the initial consonants. As a result, the required typing of inputting PINYIN by their group identification (in average of 3.86/form for 423 PINYIN forms) remains similar to that of inputting by 26 letters in Romania form individually by an ASCII compatible keyboard (in average of 3.23/form for 423 PINYIN forms).

Illustrated on FIG. 2B, ten lookup sets of elementary symbols of PINYIN have been mapped to a 4×3 key pad compatible to phone set for direct encoding. A parallel layout for classic symbols of PINYIN is also illustrated on FIG. 2C in accordance with the present invention. The three keys on the first row of the key pad are assigned to set 1, 2 and 3, respectively. The three keys on the second row of the key pad are assigned to set 4, 5 and 6, respectively. The three keys on the third row of the key pad are assigned to set 7, 8 and 9, respectively. The middle key on the last row is assigned to set 10. The coding scheme in accordance with the present invention requires only ten keys from a 4×3 key pad, and leaves other two keys for additional definition.

Illustrated on FIG. 2B, the layout in accordance with the present invention allows the PINYIN symbols from same conventional group present on the same row or column. The elements of vowel group {a, o, e} are item 3 in the lookup sets and appear on the keys of first row respectively. The elements of vowel group {i, u, ü} are item 3 in the lookup sets and appear on the keys of second row respectively. The elements of consonant group {g, k, h} are item 1 in the lookup sets and appear on first three keys of first column respectively. The elements of consonant group {z, c, s} are item 2 in the lookup sets and appear on first three keys of first column respectively. The elements of consonant group {d, t, n, l} are item 1 in the lookup sets and appear on the keys of the second column respectively. The elements of consonant group {b, p, m, f} are item 2 in the lookup sets and appear on the keys of the second column respectively. The elements of consonant group {y, w, r} are item 1 in the lookup sets and appear on first three keys of third column respectively. The elements of consonant group {j, q, x} are item 2 in the lookup sets and appear on first three keys of third column respectively.

Illustrated on FIG. 2D, the item 1 of the lookup sets appears in double on the key cap to stress double group identification requirement during coding process. It might be imprinted on key cap as first letter, capital letter or in bold face to distinguish from item 2 and 3.

Still another preferred implementation of the key pad is achieved by keys with transparent cap and embedded display device, such as a liquid crystal display device. Illustrated on FIG. 2E, the layouts of key number 2 with the embedded display device could be one of the marks: "2(ABC)", "2(Dbo)" and "2 ㄉ ㄅ ㄈ". Therefore, the appearance of key pad is result of dynamic choice according to particular requirement in accordance with the present invention. Several possible layouts of the keypad have been illustrated on FIGS. 2A, B and C respectviely. The embodiment of key cap with embedded display devices allows these layouts interchangeable on one key pad.

In accordance with the present invention, encoding a PINYIN is a sequential process which is consistent with sequential inputting process of PINYIN in Romania form. Listed in Table 2, the elementary symbols of a target PINYIN is sequential encoded by digit and inputted to computer. The inputted digit is converted to possible elementary symbols and combined with the elementary symbol string of previously inputting. While one key action may represent more than one elementary symbol of PINYIN, the non-legible form is excluded. Summarized on Table 2, based on the context of the look up table for all the elementary symbols of PINYIN, the legible PINYIN forms are constructed gradually and exclusively by group identification sequence.

Figure 4:
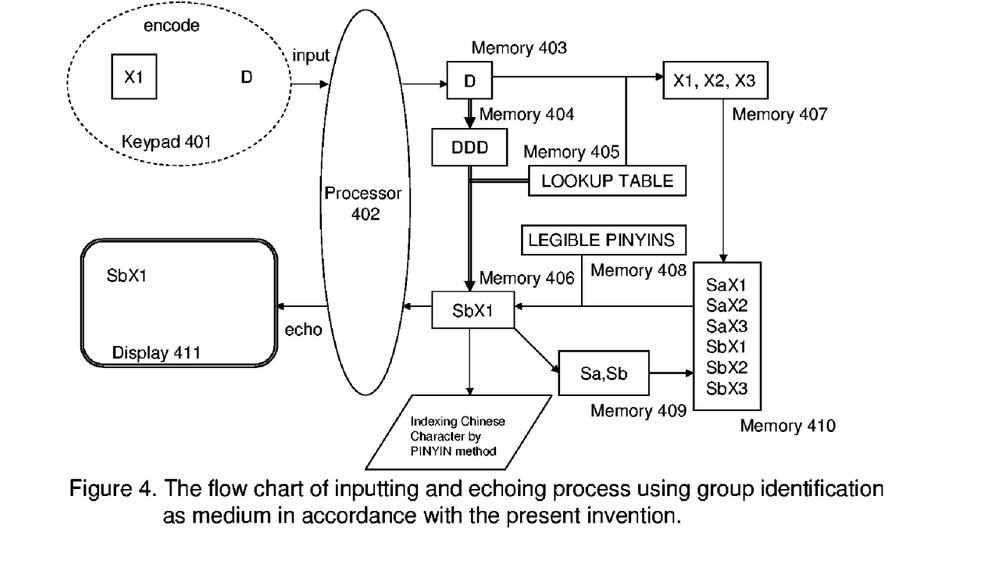
FIG. 4 discloses the components and information flow of an apparatus to input and echo PINYIN for retrieving Chinese character in accordance with the present invention.

Illustrated on FIG. 4, an apparatus based on the coding scheme of the present invention to input PINYIN has been described herein. The apparatus contains a keypad 401, a processor 402, a series of memories 403, 404, 405, 406, 407, 408, 409 and 410, and a display 411. One preferred inputting and echoing algorithm is described herein: one elementary PINYIN symbol X1 is encoded as D through directly pressing one key on keypad 401 and inputted into the processor 402. The D in memory 403 will be decoded by the processor 402 based on a lookup table stored at memory 405 as several PINYIN symbols: X1, X2 and X3, which may be stored at memory 407. In memory 409, the previous input stage may have generated two possible PINYIN symbol strings Sa and Sb. The processor 402 will combine the contents of memory 407 and 409 to generate all possible combinations of PINYIN symbol of the current input stage and store them at memory 410. The contents of memory 410 will be matched with a database 408 of all legible PINYIN forms to exclude non-legible combinations of PINYIN symbols. The legible combination may be stored at memery 406 temporarily and used to update the content of memory 409 and refresh the display device 411. Chinese character search and retrieve can be achieved by the PINYIN method using content of memory 406 as index.

Illustrated in FIG. 4, still another preferred algorithm makes use of an expanded lookup table which contains all permissible digital string in a variety of length and corresponding PINYIN symbol patterns. The contents of said table are listed in Table 3 in accordance with the present invention. One elementary PINYIN symbol X1 is encoded as D through directly pressing one key on keypad 401 and inputted into the processor 402. The D in memory 403 is packed into a digit string together with previous inputted digits and stored at memory 404. The digit string "DDD" of memory 404 will be converted into legible PINYIN form according to said expanded lookup table stored at memory 405. The result legible PINYIN form is stored at memory 406 temporarily and used to refresh the display device 411. Chinese character search and retrieve can be achieved by the PINYIN method using content of memory 406 as index.

The ambiguity of initial inputting is resolved when the digital string is elongated or the input process is terminated. Listed on Table 3, an one digit code has up to three possible elementary PINYIN symbols; for two digit string, only 4 out of 51 possible combinations have two legible forms; for 3 digit string, only 3 out of 146 possible combinations have two legible PINYIN forms; four digits and above have no ambiguous combinations. In general, the partial digit code of inputting process is mapped to a unique symbol pattern of PINYIN, allowing an exact echoing of individual elementary PINYIN symbol during the inputting process. Excluding the ambiguity for one digit code, the ambiguible two and three code strings mentioned above are: "881", "778", "112", "11", "22", "44" and "55". Their ambiguities occur on the inputting process only. Accordint to Table 3, one of the partial PINYIN forms is eliminated at the end of input, allowing a unique PINYIN form to be retrieved in accordance with the present invention.

Figure 5:
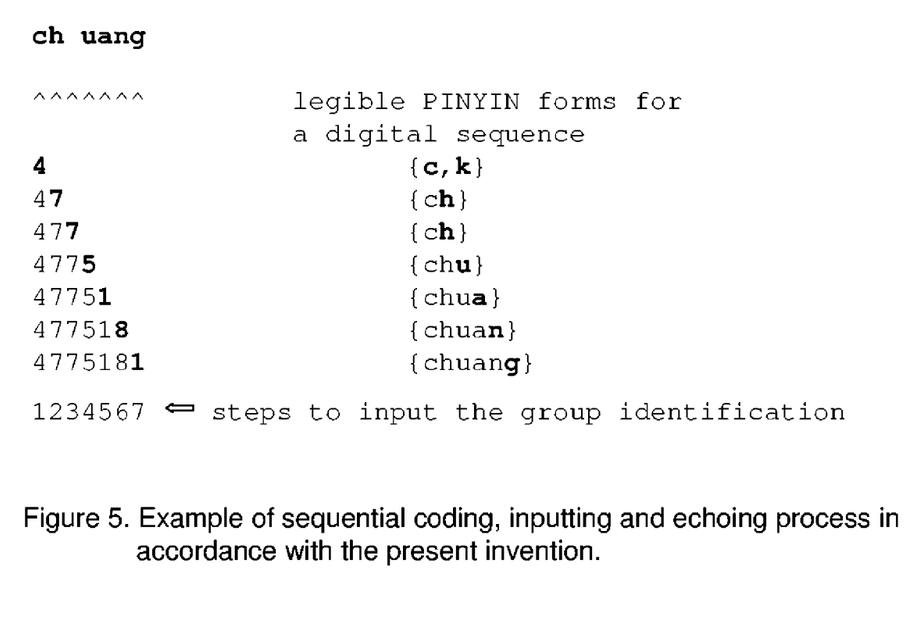
FIG. 5 illustrates the stepwise coding of elementary symbols of PINYIN, a process can be sequentially echoed in accordance with the present invention.

Packing "chuang", one of three longest PINYIN forms, needs six individual PINYIN symbols. An individual symbol inputted at each step, such as 'u', is echoed immediately on display as 'u', if input device is based on an ASCII compatible keyboard. The similar human-machine interaction can be achieved by a small key pad in accordance with the present invention. Examplery by inputting the PINYIN symbol 'u' of "chuang", illustrated on FIG. 5, the symbol is inputted by pressing key 5 that encodes 'u' as digit '5'. The processor converts '5' as a group of PINYIN symbols: "t", "p" and "u" and excludes "t" and "p" as candidates. As a result, "u" will be exclusively echoed on display device. In summary, at step 1, "c" has been coded as "4", which has two legible forms of PINYIN {k and c} at this particular stage. At step 2, "h" is coded as "7". While "7" brings h and s in, only "h" is permissible. Step 3, another "7" ends coding for "h". From step 4 to 7, the group identification brings in more than one possible elementary symbols of PINYIN. Only one legible PINYIN form can be constructed in accordance with the context of the lookup table. Based on another algorithm, each step accumulates a digit string internally. When 'u' is inputted, the digit string "4775" is used to search a legible PINYIN form according to Table 3, allowing "chu" to be echoed on the display device.

The present invention is disclosed with reference to preferred embodiments and examples detailed above. One possible modification is to use other symbols other than digit as group identification. Still another modification is to adjust member of sub groups, change the order of items or amend the coding scheme for elements. It is to be understood that these examples are intended in an illustrative rather than limiting sense, as it is contemplated that modifications will readily occur to those skilled in the art, which modifications will be within the spirit of the invention and the scope of the appended claims. The patents, papers, and books cited in this application are to be incorporated herein in their entirety.

TABLE 1

The completed list of legible PINYIN in Romania forms and the mapped
group identification sequence in accordance the present invention.
(ü is represented as v in the table)

| | | | | | | | |
|---|---|---|---|---|---|---|---|
| a | ai | an | ang | ao | ba | bai | ban | bang |
| 10 | 104 | 108 | 1081 | 102 | 21 | 214 | 218 | 2181 |
| bao | bei | ben | beng | bi | bian | biao | bie | bin |
| 212 | 234 | 238 | 2381 | 24 | 2418 | 2412 | 243 | 248 |
| bing | bo | bu | ca | cai | can | cang | cao | ce |
| 2481 | 22 | 25 | 41 | 414 | 418 | 4181 | 412 | 43 |
| cen | ceng | ci | cong | cou | cu | cuan | cui | cun |
| 438 | 4381 | 44 | 4281 | 425 | 45 | 4518 | 454 | 458 |
| cuo | cha | chai | chan | chang | chao | che | chen | cheng |
| 452 | 4771 | 47714 | 47718 | 477181 | 47712 | 4773 | 47738 | 477381 |
| chi | chong | chou | chu | chua | chuai | chuan | chuang | chui |
| 4774 | 477281 | 47725 | 4775 | 47751 | 477514 | 477518 | 4775181 | 47754 |
| chun | chuo | da | dai | dan | dang | dao | de | dei |
| 47758 | 47752 | 221 | 2214 | 2218 | 22181 | 2212 | 223 | 2234 |
| den | deng | di | dia | dian | diao | die | ding | diu |
| 2238 | 22381 | 224 | 2241 | 22418 | 22412 | 2243 | 22481 | 2245 |
| diou | dong | dou | du | duan | dui | dun | duo | e |
| 22425 | 22281 | 2225 | 225 | 22518 | 2254 | 2258 | 2252 | 30 |
| ev | ei | en | eng | er | fa | fan | fang | fei |
| 306 | 304 | 308 | 3081 | 3099 | 01 | 018 | 0181 | 034 |
| fen | feng | fo | fou | fu | ga | gai | gan | gang |
| 038 | 0381 | 02 | 025 | 05 | 111 | 1114 | 1118 | 11181 |
| gao | ge | gei | gen | geng | gong | gou | gu | gua |
| 1112 | 113 | 1134 | 1138 | 11381 | 11281 | 1125 | 115 | 1151 |
| guai | guan | guang | gui | gun | guo | ha | hai | han |
| 11514 | 11518 | 115181 | 1154 | 1158 | 1152 | 771 | 7714 | 7718 |
| hang | hao | he | hei | hen | heng | hm | hng | hong |
| 77181 | 7712 | 773 | 7734 | 7738 | 77381 | 778 | 7781 | 77281 |
| hou | hu | hua | huai | huan | huang | hui | hun | huo |
| 7725 | 775 | 7751 | 77514 | 77518 | 775181 | 7754 | 7758 | 7752 |
| ji | jia | jian | jiang | jiao | jie | jin | jing | jiu |
| 34 | 341 | 3418 | 34181 | 3412 | 343 | 348 | 3481 | 345 |
| jiou | jiong | ju | juan | jue | jun | ka | kai | kan |
| 3425 | 34281 | 35 | 3518 | 353 | 358 | 441 | 4414 | 4418 |
| kang | kao | ke | kei | ken | keng | kong | kou | ku |
| 44181 | 4412 | 443 | 4434 | 4438 | 44381 | 44281 | 4425 | 445 |
| kua | kuai | kuan | kuang | kui | kun | kuo | la | lai |
| 4451 | 44514 | 44518 | 445181 | 4454 | 4458 | 4452 | 001 | 0014 |
| lan | lang | lao | le | lei | leng | li | lia | lian |
| 0018 | 00181 | 0012 | 003 | 0034 | 00381 | 004 | 0041 | 00418 |
| liang | liao | lie | lin | ling | liu | liou | lo | long |
| 004181 | 00412 | 0043 | 0048 | 00481 | 0045 | 00425 | 002 | 00281 |
| lou | lu | lv | luan | lve | lun | luo | m | ma |
| 0025 | 005 | 006 | 00518 | 0063 | 0058 | 0052 | 8 | 81 |
| mai | man | mang | mao | me | mei | men | meng | mi |
| 814 | 818 | 8181 | 812 | 83 | 834 | 838 | 8381 | 84 |
| mian | miao | mie | min | ming | miu | miou | mo | mou |
| 8418 | 8412 | 843 | 848 | 8481 | 845 | 8425 | 82 | 825 |
| mu | n | na | nai | nan | nang | nao | ne | nei |
| 85 | 88 | 881 | 8814 | 8818 | 88181 | 8812 | 883 | 8834 |
| nen | neng | ng | ni | nia | nian | niang | niao | nie |
| 8838 | 88381 | 881 | 884 | 8841 | 88418 | 884181 | 88412 | 8843 |
| nin | ning | niu | niou | nong | nou | nu | nv | nuan |
| 8848 | 88481 | 8845 | 88425 | 88281 | 8825 | 885 | 886 | 88518 |
| nve | nuo | o | ou | pa | pai | pan | pang | pao |
| 8863 | 8852 | 20 | 205 | 51 | 514 | 518 | 5181 | 512 |
| pei | pen | peng | pi | pian | piao | pie | pin | ping |
| 534 | 538 | 5381 | 54 | 5418 | 5412 | 543 | 548 | 5481 |
| po | pou | pu | qi | qia | qian | qiang | qiao | qie |
| 52 | 525 | 55 | 64 | 641 | 6418 | 64181 | 6412 | 643 |
| qin | qing | qiong | qiu | qiou | qu | quan | que | qun |
| 648 | 6481 | 64281 | 645 | 6425 | 65 | 6518 | 653 | 658 |
| ran | rang | rao | re | ren | reng | ri | rong | rou |
| 9918 | 99181 | 9912 | 993 | 9938 | 99381 | 994 | 99281 | 9925 |
| ru | ruan | rui | run | ruo | sa | sai | san | sang |
| 995 | 99518 | 9954 | 9958 | 9952 | 71 | 714 | 718 | 7181 |
| sao | se | sen | seng | si | song | sou | su | suan |
| 712 | 73 | 738 | 7381 | 74 | 7281 | 725 | 75 | 7518 |
| sui | sun | suo | sha | shai | shan | shang | shao | she |
| 754 | 758 | 752 | 7771 | 77714 | 77718 | 777181 | 77712 | 7773 |
| shei | shen | sheng | shi | shou | shu | shua | shuai | shuan |
| 77734 | 77738 | 777381 | 7774 | 77725 | 7775 | 77751 | 777514 | 777518 |
| shuang | shui | shun | shuo | ta | tai | tan | tang | tao |
| 7775181 | 77754 | 77758 | 77752 | 551 | 5514 | 5518 | 55181 | 5512 |
| te | teng | ti | tian | tiao | tie | ting | tong | tou |

TABLE 1-continued

The completed list of legible PINYIN in Romania forms and the mapped group identification sequence in accordance the present invention.
(ü is represented as v in the table)

| 553 | 55381 | 554 | 55418 | 55412 | 5543 | 55481 | 55281 | 5525 |
|---|---|---|---|---|---|---|---|---|
| tu | tuan | tui | tun | tuo | wa | wai | wan | wang |
| 555 | 55518 | 5554 | 5558 | 5552 | 661 | 6614 | 6618 | 66181 |
| wei | wen | weng | wo | wu | xi | xia | xian | xiang |
| 6634 | 6638 | 66381 | 662 | 665 | 94 | 941 | 9418 | 94181 |
| xiao | xie | xin | xing | xiong | xiu | xiou | xu | xuan |
| 9412 | 943 | 948 | 9481 | 94281 | 945 | 9425 | 95 | 9518 |
| xue | xun | ya | yan | yang | yao | ye | yi | yin |
| 953 | 958 | 331 | 3318 | 33181 | 3312 | 333 | 334 | 3348 |
| ying | yo | yong | you | yu | yuan | yue | yun | za |
| 33481 | 332 | 33281 | 3325 | 335 | 33518 | 3353 | 3358 | 11 |
| zai | zan | zang | zao | ze | zei | zen | zeng | zi |
| 114 | 118 | 1181 | 112 | 13 | 134 | 138 | 1381 | 14 |
| zong | zou | zu | zuan | zui | zun | zuo | zha | zhai |
| 1281 | 125 | 15 | 1518 | 154 | 158 | 152 | 1771 | 17714 |
| zhan | zhang | zhao | zhe | zhei | zhen | zheng | zhi | zhong |
| 17718 | 177181 | 17712 | 1773 | 17734 | 17738 | 177381 | 1774 | 177281 |
| zhou | zhu | zhua | zhuai | zhuan | zhuang | zhui | zhun | zhuo |
| 17725 | 1775 | 17751 | 177514 | 177518 | 1775181 | 17754 | 17758 | 17752 |

TABLE 2

The sequential coding and echoing for all legible PINYIN forms in accordance with the present invention (ü is represented as v in the list)

| Target | Step 1 | Step 2 | Step 3 | Step 4 | Step 5 | Step 6 | Step 7 |
|---|---|---|---|---|---|---|---|
| la | 0{l, f} | 00{l} | 001{la} | | | | |
| lao | 0{l, f} | 00{l} | 001{la} | 0012{lao} | | | |
| lai | 0{l, f} | 00{l} | 001{la} | 0014{lai} | | | |
| lan | 0{l, f} | 00{l} | 001{la} | 0018{lan} | | | |
| lang | 0{l, f} | 00{l} | 001{la} | 0018{lan} | 00181{lang} | | |
| lo | 0{l, f} | 00{l} | 002{lo} | | | | |
| lou | 0{l, f} | 00{l} | 002{lo} | 0025{lou} | | | |
| long | 0{l, f} | 00{l} | 002{lo} | 0028{lon} | 00281{long} | | |
| le | 0{l, f} | 00{l} | 003{le} | | | | |
| lei | 0{l, f} | 00{l} | 003{le} | 0034{lei} | | | |
| leng | 0{l, f} | 00{l} | 003{le} | 0038{len} | 00381{leng} | | |
| li | 0{l, f} | 00{l} | 004{li} | | | | |
| lia | 0{l, f} | 00{l} | 004{li} | 0041{lia} | | | |
| liao | 0{l, f} | 00{l} | 004{li} | 0041{lia} | 00412{liao} | | |
| lian | 0{l, f} | 00{l} | 004{li} | 0041{lia} | 00418{lian} | | |
| liang | 0{l, f} | 00{l} | 004{li} | 0041{lia} | 00418{lian} | 004181{liang} | |
| liou | 0{l, f} | 00{l} | 004{li} | 0042{lio} | 00425{liou} | | |
| lie | 0{l, f} | 00{l} | 004{li} | 0043{lie} | | | |
| liu | 0{l, f} | 00{l} | 004{li} | 0045{liu} | | | |
| lin | 0{l, f} | 00{l} | 004{li} | 0048{lin} | | | |
| ling | 0{l, f} | 00{l} | 004{li} | 0048{lin} | 00481{ling} | | |
| lu | 0{l, f} | 00{l} | 005{lu} | | | | |
| luan | 0{l, f} | 00{l} | 005{lu} | 0051{lua} | 00518{luan} | | |
| luo | 0{l, f} | 00{l} | 005{lu} | 0052{luo} | | | |
| lun | 0{l, f} | 00{l} | 005{lu} | 0058{lun} | | | |
| lv | 0{l, f} | 00{l} | 006{lv} | | | | |
| lve | 0{l, f} | 00{l} | 006{lv} | 0063{lve} | | | |
| fa | 0{l, f} | 01{fa} | | | | | |
| fan | 0{l, f} | 01{fa} | 018{fan} | | | | |
| fang | 0{l, f} | 01{fa} | 018{fan} | 0181{fang} | | | |
| fo | 0{l, f} | 02{fo} | | | | | |
| fou | 0{l, f} | 02{fo} | 025{fou} | | | | |
| fei | 0{l, f} | 03{fe} | 034{fei} | | | | |
| fen | 0{l, f} | 03{fe} | 038{fen} | | | | |
| feng | 0{l, f} | 03{fe} | 038{fen} | 0381{feng} | | | |
| fu | 0{l, f} | 05{fu} | | | | | |
| a | 1{g, z, a} | 10{a} | | | | | |
| ao | 1{g, z, a} | 10{a} | 102{ao} | | | | |
| ai | 1{g, z, a} | 10{a} | 104{ai} | | | | |
| an | 1{g, z, a} | 10{a} | 108{an} | | | | |
| ang | 1{g, z, a} | 10{a} | 108{an} | 1081{ang} | | | |
| za | 1{g, z, a} | 11{g, za} | | | | | |
| ga | 1{g, z, a} | 11{g, za} | 111{ga} | | | | |
| gao | 1{g, z, a} | 11{g, za} | 111{ga} | 1112{gao} | | | |
| gai | 1{g, z, a} | 11{g, za} | 111{ga} | 1114{gai} | | | |

TABLE 2-continued

The sequential coding and echoing for all legible PINYIN forms in
accordance with the present invention (ü is represented as v in the list)

| Target | Step 1 | Step 2 | Step 3 | Step 4 | Step 5 | Step 6 | Step 7 |
|---|---|---|---|---|---|---|---|
| gan | 1{g, z, a} | 11{g, za} | 111{ga} | 1118{gan} | | | |
| gang | {g, z, a} | 11{g, za} | 111{ga} | 1118{gan} | 11181{gang} | | |
| zao | 1{g, z, a} | 11{g, za} | 112{go, zao} | | | | |
| gou | 1{g, z, a} | 11{g, za} | 112{go, zao} | 1125{gou} | | | |
| gong | 1{g, z, a} | 11{g, za} | 112{go, zao} | 1128{gon} | 11281{gong} | | |
| ge | {g, z, a} | 11{g, za} | 113{ge} | | | | |
| gei | 1{g, z, a} | 11{g, za} | 113{ge} | 1134{gei} | | | |
| gen | 1{g, z, a} | 11{g, za} | 113{ge} | 1138{gen} | | | |
| geng | 1{g, z, a} | 11{g, za} | 113{ge} | 1138{gen} | 11381{geng} | | |
| zai | 1{g, z, a} | 11{g, za} | 114{zai} | | | | |
| gu | 1{g, z, a} | 11{g, za} | 115{gu} | | | | |
| gua | 1{g, z, a} | 11{g, za} | 115{gu} | 1151{gua} | | | |
| guai | 1{g, z, a} | 11{g, za} | 115{gu} | 1151{gua} | 11514{guai} | | |
| guan | 1{g, z, a} | 11{g, za} | 115{gu} | 1151{gua} | 11518{guan} | | |
| guang | 1{g, z, a} | 11{g, za} | 115{gu} | 1151{gua} | 11518{guan} | 115181{guang} | |
| guo | 1{g, z, a} | 11{g, za} | 115{gu} | 1152{guo} | | | |
| gui | 1{g, z, a} | 11{g, za} | 115{gu} | 1154{gui} | | | |
| gun | 1{g, z, a} | 11{g, za} | 115{gu} | 1158{gun} | | | |
| zan | 1{g, z, a} | 11{g, za} | 118{zan} | | | | |
| zang | 1{g, z, a} | 11{g, za} | 118{zan} | 1181{zang} | | | |
| zou | 1{g, z, a} | 12{zo} | 125{zou} | | | | |
| zong | 1{g, z, a} | 12{zo} | 128{zon} | 1281{zong} | | | |
| ze | 1{g, z, a} | 13{ze} | | | | | |
| zei | 1{g, z, a} | 13{ze} | 134{zei} | | | | |
| zen | 1{g, z, a} | 13{ze} | 138{zen} | | | | |
| zeng | 1{g, z, a} | 13{ze} | 138{zen} | 1381{zeng} | | | |
| zi | 1{g, z, a} | 14{zi} | | | | | |
| zu | 1{g, z, a} | 15{zu} | | | | | |
| zuan | 1{g, z, a} | 15{zu} | 151{zua} | 1518{zuan} | | | |
| zuo | 1{g, z, a} | 15{zu} | 152{zuo} | | | | |
| zui | 1{g, z, a} | 15{zu} | 154{zui} | | | | |
| zun | 1{g, z, a} | 15{zu} | 158{zun} | | | | |
| zha | 1{g, z, a} | 17{zh} | 177{zh} | 1771{zha} | | | |
| zhao | 1{g, z, a} | 17{zh} | 177{zh} | 1771{zha} | 17712{zhao} | | |
| zhai | 1{g, z, a} | 17{zh} | 177{zh} | 1771{zha} | 17714{zhai} | | |
| zhan | 1{g, z, a} | 17{zh} | 177{zh} | 1771{zha} | 17718{zhan} | | |
| zhang | 1{g, z, a} | 17{zh} | 177{zh} | 1771{zha} | 17718{zhan} | 177181{zhang} | |
| zhou | 1{g, z, a} | 17{zh} | 177{zh} | 1772{zho} | 17725{zhou} | | |
| zhong | 1{g, z, a} | 17{zh} | 177{zh} | 1772{zho} | 17728{zhon} | 177281{zhong} | |
| zhe | 1{g, z, a} | 17{zh} | 177{zh} | 1773{zhe} | | | |
| zhei | 1{g, z, a} | 17{zh} | 177{zh} | 1773{zhe} | 17734{zhei} | | |
| zhen | 1{g, z, a} | 17{zh} | 177{zh} | 1773{zhe} | 17738{zhen} | | |
| zheng | 1{g, z, a} | 17{zh} | 177{zh} | 1773{zhe} | 17738{zhen} | 177381{zheng} | |
| zhi | 1{g, z, a} | 17{zh} | 177{zh} | 1774{zhi} | | | |
| zhu | 1{g, z, a} | 17{zh} | 177{zh} | 1775{zhu} | | | |
| zhua | 1{g, z, a} | 17{zh} | 177{zh} | 1775{zhu} | 17751{zhua} | | |
| zhuai | 1{g, z, a} | 17{zh} | 177{zh} | 1775{zhu} | 17751{zhua} | 177514{zhuai} | |
| zhuan | 1{g, z, a} | 17{zh} | 177{zh} | 1775{zhu} | 17751{zhua} | 177518{zhuan} | |
| zhuang | 1{g, z, a} | 17{zh} | 177{zh} | 1775{zhu} | 17751{zhua} | 177518{zhuan} | 1775181{zhuang} |
| zhuo | 1{g, z, a} | 17{zh} | 177{zh} | 1775{zhu} | 17752{zhuo} | | |
| zhui | 1{g, z, a} | 17{zh} | 177{zh} | 1775{zhu} | 17754{zhui} | | |
| zhun | 1{g, z, a} | 17{zh} | 177{zh} | 1775{zhu} | 17758{zhun} | | |
| o | 2{d, b, o} | 20{o} | | | | | |
| ou | 2{d, b, o} | 20{o} | 205{ou} | | | | |
| ba | 2{d, b, o} | 21{ba} | | | | | |
| bao | 2{d, b, o} | 21{ba} | 212{bao} | | | | |
| bai | 2{d, b, o} | 21{ba} | 214{bai} | | | | |
| ban | 2{d, b, o} | 21{ba} | 218{ban} | | | | |
| bang | 2{d, b, o} | 21{ba} | 218{ban} | 2181{bang} | | | |
| bo | 2{d, b, o} | 22{d, bo} | | | | | |
| da | 2{d, b, o} | 22{d, bo} | 221{da} | | | | |
| dao | 2{d, b, o} | 22{d, bo} | 221{da} | 2212{dao} | | | |
| dai | 2{d, b, o} | 22{d, bo} | 221{da} | 2214{dai} | | | |
| dan | 2{d, b, o} | 22{d, bo} | 221{da} | 2218{dan} | | | |
| dang | 2{d, b, o} | 22{d, bo} | 221{da} | 2218{dan} | 22181{dang} | | |
| dou | 2{d, b, o} | 22{d, bo} | 222{do} | 2225{dou} | | | |
| dong | 2{d, b, o} | 22{d, bo} | 222{do} | 2228{don} | 22281{dong} | | |
| de | 2{d, b, o} | 22{d, bo} | 223{de} | | | | |
| dei | 2{d, b, o} | 22{d, bo} | 223{de} | 2234{dei} | | | |
| den | 2{d, b, o} | 22{d, bo} | 223{de} | 2238{den} | | | |
| deng | 2{d, b, o} | 22{d, bo} | 223{de} | 2238{den} | 22381{deng} | | |
| di | 2{d, b, o} | 22{d, bo} | 224{di} | | | | |
| dia | 2{d, b, o} | 22{d, bo} | 224{di} | 2241{dia} | | | |
| diao | 2{d, b, o} | 22{d, bo} | 224{di} | 2241{dia} | 22412{diao} | | |

TABLE 2-continued

The sequential coding and echoing for all legible PINYIN forms in accordance with the present invention (ü is represented as v in the list)

| Target | Step 1 | Step 2 | Step 3 | Step 4 | Step 5 | Step 6 | Step 7 |
|---|---|---|---|---|---|---|---|
| dian | 2{d, b, o} | 22{d, bo} | 224{di} | 2241{dia} | 22418{dian} | | |
| diou | 2{d, b, o} | 22{d, bo} | 224{di} | 2242{dio} | 22425{diou} | | |
| die | 2{d, b, o} | 22{d, bo} | 224{di} | 2243{die} | | | |
| diu | 2{d, b, o} | 22{d, bo} | 224{di} | 2245{diu} | | | |
| ding | 2{d, b, o} | 22{d, bo} | 224{di} | 2248{din} | 22481{ding} | | |
| du | 2{d, b, o} | 22{d, bo} | 225{du} | | | | |
| duan | 2{d, b, o} | 22{d, bo} | 225{du} | 2251{dua} | 22518{duan} | | |
| duo | 2{d, b, o} | 22{d, bo} | 225{du} | 2252{duo} | | | |
| dui | 2{d, b, o} | 22{d, bo} | 225{du} | 2254{dui} | | | |
| dun | 2{d, b, o} | 22{d, bo} | 225{du} | 2258{dun} | | | |
| bei | 2{d, b, o} | 23{be} | 234{bei} | | | | |
| ben | 2{d, b, o} | 23{be} | 238{ben} | | | | |
| beng | 2{d, b, o} | 23{be} | 238{ben} | 2381{beng} | | | |
| bi | 2{d, b, o} | 24{bi} | | | | | |
| biao | 2{d, b, o} | 24{bi} | 241{bia} | 2412{biao} | | | |
| bian | 2{d, b, o} | 24{bi} | 241{bia} | 2418{bian} | | | |
| bie | 2{d, b, o} | 24{bi} | 243{bie} | | | | |
| bin | 2{d, b, o} | 24{bi} | 248{bin} | | | | |
| bing | 2{d, b, o} | 24{bi} | 248{bin} | 2481{bing} | | | |
| bu | 2{d, b, o} | 25{bu} | | | | | |
| e | 3{y, j, e} | 30{e} | | | | | |
| ei | 3{y, j, e} | 30{e} | 304{ei} | | | | |
| ev | 3{y, j, e} | 30{e} | 306{ev} | | | | |
| en | 3{y, j, e} | 30{e} | 308{en} | | | | |
| eng | 3{y, j, e} | 30{e} | 308{en} | 3081{eng} | | | |
| er | 3{y, j, e} | 30{e} | 309{er} | 3099{er} | | | |
| ya | 3{y, j, e} | 33{y} | 331{ya} | | | | |
| yao | 3{y, j, e} | 33{y} | 331{ya} | 3312{yao} | | | |
| yan | 3{y, j, e} | 33{y} | 331{ya} | 3318{yar} | | | |
| yang | 3{y, j, e} | 33{y} | 331{ya} | 3318{yan} | 33181{yang} | | |
| yo | 3{y, j, e} | 33{y} | 332{yo} | | | | |
| you | 3{y, j, e} | 33{y} | 332{yo} | 3325{you} | | | |
| yong | 3{y, j, e} | 33{y} | 332{yo} | 3328{yon} | 33281{yong} | | |
| ye | 3{y, j, e} | 33{y} | 333{ye} | | | | |
| yi | 3{y, j, e} | 33{y} | 334{yi} | | | | |
| yin | 3{y, j, e} | 33{y} | 334{yi} | 3348{yin} | | | |
| ying | 3{y, j, e} | 33{y} | 334{yi} | 3348{yin} | 33481{ying} | | |
| yu | 3{y, j, e} | 33{y} | 335{yu} | | | | |
| yuan | 3{y, j, e} | 33{y} | 335{yu} | 3351{yua} | 33518{yuan} | | |
| yue | 3{y, j, e} | 33{y} | 335{yu} | 3353{yue} | | | |
| yun | 3{y, j, e} | 33{y} | 335{yu} | 3358{yun} | | | |
| ji | 3{y, j, e} | 34{ji} | | | | | |
| jia | 3{y, j, e} | 34{ji} | 341{jia} | | | | |
| jiao | 3{y, j, e} | 34{ji} | 341{jia} | 3412{jiao} | | | |
| jian | 3{y, j, e} | 34{ji} | 341{jia} | 3418{jian} | | | |
| jiang | 3{y, j, e} | 34{ji} | 341{jia} | 3418{jian} | 34181{jiang} | | |
| jiou | 3{y, j, e} | 34{ji} | 342{jio} | 3425{jiou} | | | |
| jiong | 3{y, j, e} | 34{ji} | 342{jio} | 3428{jion} | 34281{jiong} | | |
| jie | 3{y, j, e} | 34{ji} | 343{jie} | | | | |
| jiu | 3{y, j, e} | 34{ji} | 345{jiu} | | | | |
| jin | 3{y, j, e} | 34{ji} | 348{jin} | | | | |
| jing | 3{y, j, e} | 34{ji} | 348{jin} | 3481{jing} | | | |
| ju | 3{y, j, e} | 35{ju} | | | | | |
| juan | 3{y, j, e} | 35{ju} | 351{jua} | 3518{Juan} | | | |
| jue | 3{y, j, e} | 35{ju} | 353{jue} | | | | |
| jun | 3{y, j, e} | 35{ju} | 358{jun} | | | | |
| ca | 4{k, c} | 41{ca} | | | | | |
| cao | 4{k, c} | 41{ca} | 412{cao} | | | | |
| cai | 4{k, c} | 41{ca} | 414{cai} | | | | |
| can | 4{k, c} | 41{ca} | 418{can} | | | | |
| cang | 4{k, c} | 41{ca} | 418{can} | 4181{cang} | | | |
| cou | 4{k, c} | 42{co} | 425{cou} | | | | |
| cong | 4{k, c} | 42{co} | 428{con} | 4281{cong} | | | |
| ce | 4{k, c} | 43{ce} | | | | | |
| cen | 4{k, c} | 43{ce} | 438{cen} | | | | |
| ceng | 4{k, c} | 43{ce} | 438{cen} | 4381{ceng} | | | |
| ci | 4{k, c} | 44{k, ci} | | | | | |
| ka | 4{k, c} | 44{k, ci} | 441{ka} | | | | |
| kao | 4{k, c} | 44{k, ci} | 441{ka} | 4412{kao} | | | |
| kai | 4{k, c} | 44{k, ci} | 441{ka} | 4414{kai} | | | |
| kan | 4{k, c} | 44{k, ci} | 441{ka} | 4418{kan} | | | |
| kang | 4{k, c} | 44{k, ci} | 441{ka} | 4418{kan} | 44181{kang} | | |
| kou | 4{k, c} | 44{k, ci} | 442{ko} | 4425{kou} | | | |
| kong | 4{k, c} | 44{k, ci} | 442{ko} | 4428{kon} | 44281{kong} | | |

TABLE 2-continued

The sequential coding and echoing for all legible PINYIN forms in
accordance with the present invention (ü is represented as v in the list)

| Target | Step 1 | Step 2 | Step 3 | Step 4 | Step 5 | Step 6 | Step 7 |
|---|---|---|---|---|---|---|---|
| ke | 4{k, c} | 44{k, ci} | 443{ke} | | | | |
| kei | 4{k, c} | 44{k, ci} | 443{ke} | 4434{kei} | | | |
| ken | 4{k, c} | 44{k, ci} | 443{ke} | 4438{ken} | | | |
| keng | 4{k, c} | 44{k, ci} | 443{ke} | 4438{ken} | 44381{keng} | | |
| ku | 4{k, c} | 44{k, ci} | 445{ku} | | | | |
| kua | 4{k, c} | 44{k, ci} | 445{ku} | 4451{kua} | | | |
| kuai | 4{k, c} | 44{k, ci} | 445{ku} | 4451{kua} | 44514{kuai} | | |
| kuan | 4{k, c} | 44{k, ci} | 445{ku} | 4451{kua} | 44518{kuan} | | |
| kuang | 4{k, c} | 44{k, ci} | 445{ku} | 4451{kua} | 44518{kuan} | 445181{kuang} | |
| kuo | 4{k, c} | 44{k, ci} | 445{ku} | 4452{kuo} | | | |
| kui | 4{k, c} | 44{k, ci} | 445{ku} | 4454{kui} | | | |
| kun | 4{k, c} | 44{k, ci} | 445{ku} | 4458{kun} | | | |
| cu | 4{k, c} | 45{cu} | | | | | |
| cuan | 4{k, c} | 45{cu} | 451{cua} | 4518{cuan} | | | |
| cuo | 4{k, c} | 45{cu} | 452{cuo} | | | | |
| cui | 4{k, c} | 45{cu} | 454{cui} | | | | |
| cun | 4{k, c} | 45{cu} | 458{cun} | | | | |
| cha | 4{k, c} | 47{ch} | 477{ch} | 4771{cha} | | | |
| chao | 4{k, c} | 47{ch} | 477{ch} | 4771{cha} | 47712{chao} | | |
| chai | 4{k, c} | 47{ch} | 477{ch} | 4771{cha} | 47714{chai} | | |
| chan | 4{k, c} | 47{ch} | 477{ch} | 4771{cha} | 47718{chan} | | |
| chang | 4{k, c} | 47{ch} | 477{ch} | 4771{cha} | 47718{chan} | 477181{chang} | |
| chou | 4{k, c} | 47{ch} | 477{ch} | 4772{cho} | 47725{chou} | | |
| chong | 4{k, c} | 47{ch} | 477{ch} | 4772{cho} | 47728{chon} | 477281{chong} | |
| che | 4{k, c} | 47{ch} | 477{ch} | 4773{che} | | | |
| chen | 4{k, c} | 47{ch} | 477{ch} | 4773{che} | 47738{chen} | | |
| cheng | 4{k, c} | 47{ch} | 477{ch} | 4773{che} | 47738{chen} | 477381{cheng} | |
| chi | 4{k, c} | 47{ch} | 477{ch} | 4774{chi} | | | |
| chu | 4{k, c} | 47{ch} | 477{ch} | 4775{chu} | | | |
| chua | 4{k, c} | 47{ch} | 477{ch} | 4775{chu} | 47751{chua} | | |
| chuai | 4{k, c} | 47{ch} | 477{ch} | 4775{chu} | 47751{chua} | 477514{chuai} | |
| chuan | 4{k, c} | 47{ch} | 477{ch} | 4775{chu} | 47751{chua} | 477518{chuan} | |
| chuang | 4{k, c} | 47{ch} | 477{ch} | 4775{chu} | 47751{chua} | 477518{chuan} | 4775181{chuang} |
| chuo | 4{k, c} | 47{ch} | 477{ch} | 4775{chu} | 47752{chuo} | | |
| chui | 4{k, c} | 47{ch} | 477{ch} | 4775{chu} | 47754{chui} | | |
| chun | 4{k, c} | 47{ch} | 477{ch} | 4775{chu} | 47758{chun} | | |
| pa | 5{t, p} | 51{pa} | | | | | |
| pao | 5{t, p} | 51{pa} | 512{pao} | | | | |
| pai | 5{t, p} | 51{pa} | 514{pai} | | | | |
| pan | 5{t, p} | 51{pa} | 518{pan} | | | | |
| pang | 5{t, p} | 51{pa} | 518{pan} | 5181{pang} | | | |
| po | 5{t, p} | 52{po} | | | | | |
| pou | 5{t, p} | 52{po} | 525{pou} | | | | |
| pei | 5{t, p} | 53{pe} | 534{pei} | | | | |
| pen | 5{t, p} | 53{pe} | 538{pen} | | | | |
| peng | 5{t, p} | 53{pe} | 538{pen} | 5381{peng} | | | |
| pi | 5{t, p} | 54{pi} | | | | | |
| piao | 5{t, p} | 54{pi} | 541{pia} | 5412{piao} | | | |
| pian | 5{t, p} | 54{pi} | 541{pia} | 5418{pian} | | | |
| pie | 5{t, p} | 54{pi} | 543{pie} | | | | |
| pin | 5{t, p} | 54{pi} | 548{pin} | | | | |
| ping | 5{t, p} | 54{pi} | 548{pin} | 5481{ping} | | | |
| pu | 5{t, p} | 55{t, pu} | | | | | |
| ta | 5{t, p} | 55{t, pu} | 551{ta} | | | | |
| tao | 5{t, p} | 55{t, pu} | 551{ta} | 5512{tao} | | | |
| tai | 5{t, p} | 55{t, pu} | 551{ta} | 5514{tai} | | | |
| tan | 5{t, p} | 55{t, pu} | 551{ta} | 5518{tan} | | | |
| tang | 5{t, p} | 55{t, pu} | 551{ta} | 5518{tan} | 55181{tang} | | |
| tou | 5{t, p} | 55{t, pu} | 552{to} | 5525{tou} | | | |
| tong | 5{t, p} | 55{t, pu} | 552{to} | 5528{ton} | 55281{tong} | | |
| te | 5{t, p} | 55{t, pu} | 553{te} | | | | |
| teng | 5{t, p} | 55{t, pu} | 553{te} | 5538{ten} | 55381{teng} | | |
| ti | 5{t, p} | 55{t, pu} | 554{ti} | | | | |
| tiao | 5{t, p} | 55{t, pu} | 554{ti} | 5541{tia} | 55412{tiao} | | |
| tian | 5{t, p} | 55{t, pu} | 554{ti} | 5541{tia} | 55418{tian} | | |
| tie | 5{t, p} | 55{t, pu} | 554{ti} | 5543{tie} | | | |
| ting | 5{t, p} | 55{t, pu} | 554{ti} | 5548{tin} | 55481{ting} | | |
| tu | 5{t, p} | 55{t, pu} | 555{tu} | | | | |
| tuan | 5{t, p} | 55{t, pu} | 555{tu} | 5551{tua} | 55518{tuan} | | |
| tuo | 5{t, p} | 55{t, pu} | 555{tu} | 5552{tuo} | | | |
| tui | 5{t, p} | 55{t, pu} | 555{tu} | 5554{tui} | | | |
| tun | 5{t, p} | 55{t, pu} | 555{tu} | 5558{tun} | | | |
| qi | 6{w, q} | 64{qi} | | | | | |
| qia | 6{w, q} | 64{qi} | 641{qia} | | | | |

TABLE 2-continued

The sequential coding and echoing for all legible PINYIN forms in
accordance with the present invention (ü is represented as v in the list)

| Target | Step 1 | Step 2 | Step 3 | Step 4 | Step 5 | Step 6 | Step 7 |
|---|---|---|---|---|---|---|---|
| qiao | 6{w, q} | 64{qi} | 641{qia} | 6412{qiao} | | | |
| qian | 6{w, q} | 64{qi} | 641{qia} | 6418{qian} | | | |
| qiang | 6{w, q} | 64{qi} | 641{qia} | 6418{qian} | 64181{qiang} | | |
| qiou | 6{w, q} | 64{qi} | 642{qio} | 6425{qio$$} | | | |
| qiong | 6{w, q} | 64{qi} | 642{qio} | 6428{qion} | 64281{qiong} | | |
| qie | 6{w, q} | 64{qi} | 643{qie} | | | | |
| qiu | 6{w, q} | 64{qi} | 645{qiu} | | | | |
| qin | 6{w, q} | 64{qi} | 648{qin} | | | | |
| qing | 6{w, q} | 64{qi} | 648{qin} | 6481{qing} | | | |
| qu | 6{w, q} | 65{qu} | | | | | |
| quan | 6{w, q} | 65{qu} | 651{qua} | 6518{quan} | | | |
| que | 6{w, q} | 65{qu} | 653{que} | | | | |
| qun | 6{w, q} | 65{qu} | 658{qun} | | | | |
| wa | 6{w, q} | 66{w} | 661{wa} | | | | |
| wai | 6{w, q} | 66{w} | 661{wa} | 6614{wai} | | | |
| wan | 6{w, q} | 66{w} | 661{wa} | 6618{wan} | | | |
| wang | 6{w, q} | 66{w} | 661{wa} | 6618{wan} | 66181{wang} | | |
| wo | 6{w, q} | 66{w} | 662{wo} | | | | |
| wei | 6{w, q} | 66{w} | 663{we} | 6634{wei} | | | |
| wen | 6{w, q} | 66{w} | 663{we} | 6638{wen} | | | |
| weng | 6{w, q} | 66{w} | 663{we} | 6638{wen} | 66381{weng} | | |
| wu | 6{w, q} | 66{w} | 665{wu} | | | | |
| sa | 7{h, s} | 71{sa} | | | | | |
| sao | 7{h, s} | 71{sa} | 712{sao} | | | | |
| sai | 7{h, s} | 71{sa} | 714{sai} | | | | |
| san | 7{h, s} | 71{sa} | 718{san} | | | | |
| sang | 7{h, s} | 71{sa} | 718{san} | 7181{sang} | | | |
| sou | 7{h, s} | 72{so} | 725{sou} | | | | |
| song | 7{h, s} | 72{so} | 728{son} | 7281{song} | | | |
| se | 7{h, s} | 73{se} | | | | | |
| sen | 7{h, s} | 73{se} | 738{sen} | | | | |
| seng | 7{h, s} | 73{se} | 738{sen} | 7381{seng} | | | |
| si | 7{h, s} | 74{si} | | | | | |
| su | 7{h, s} | 75{su} | | | | | |
| suan | 7{h, s} | 75{su} | 751{sua} | 7518{suan} | | | |
| suo | 7{h, s} | 75{su} | 752{suo} | | | | |
| sui | 7{h, s} | 75{su} | 754{sui} | | | | |
| sun | 7{h, s} | 75{su} | 758{sun} | | | | |
| ha | 7{h, s} | 77{h} | 771{ha} | | | | |
| hao | 7{h, s} | 77{h} | 771{ha} | 7712{hao} | | | |
| hai | 7{h, s} | 77{h} | 771{ha} | 7714{hai} | | | |
| han | 7{h, s} | 77{h} | 771{ha} | 7718{han} | | | |
| hang | 7{h, s} | 77{h} | 771{ha} | 7718{han} | 77181{hang} | | |
| hou | 7{h, s} | 77{h} | 772{ho} | 7725{hou} | | | |
| hong | 7{h, s} | 77{h} | 772{ho} | 7728{hon} | 77281{hong} | | |
| he | 7{h, s} | 77{h} | 773{he} | | | | |
| hei | 7{h, s} | 77{h} | 773{he} | 7734{hei} | | | |
| hen | 7{h, s} | 77{h} | 773{he} | 7738{hen} | | | |
| heng | 7{h, s} | 77{h} | 773{he} | 7738{hen} | 77381{heng} | | |
| hu | 7{h, s} | 77{h} | 775{hu} | | | | |
| hua | 7{h, s} | 77{h} | 775{hu} | 7751{hua} | | | |
| huai | 7{h, s} | 77{h} | 775{hu} | 7751{hua} | 77514{huai} | | |
| huan | 7{h, s} | 77{h} | 775{hu} | 7751{hua} | 77518{huan} | | |
| huang | 7{h, s} | 77{h} | 775{hu} | 7751{hua} | 77518{huan} | 775181{huang} | |
| huo | 7{h, s} | 77{h} | 775{hu} | 7752{huo} | | | |
| hui | 7{h, s} | 77{h} | 775{hu} | 7754{hui} | | | |
| hun | 7{h, s} | 77{h} | 775{hu} | 7758{hun} | | | |
| sha | 7{h, s} | 77{h} | 777{sh} | 7771{sha} | | | |
| shao | 7{h, s} | 77{h} | 777{sh} | 7771{sha} | 77712{shao} | | |
| shai | 7{h, s} | 77{h} | 777{sh} | 7771{sha} | 77714{shai} | | |
| shan | 7{h, s} | 77{h} | 777{sh} | 7771{sha} | 77718{shan} | | |
| shang | 7{h, s} | 77{h} | 777{sh} | 7771{sha} | 77718{shan} | 777181{shang} | |
| shou | 7{h, s} | 77{h} | 777{sh} | 7772{sho} | 77725{shou} | | |
| she | 7{h, s} | 77{h} | 777{sh} | 7773{she} | | | |
| shei | 7{h, s} | 77{h} | 777{sh} | 7773{she} | 77734{shei} | | |
| shen | 7{h, s} | 77{h} | 777{sh} | 7773{she} | 77738{shen} | | |
| sheng | 7{h, s} | 77{h} | 777{sh} | 7773{she} | 77738{shen} | 777381{sheng} | |
| shi | 7{h, s} | 77{h} | 777{sh} | 7774{shi} | | | |
| shu | 7{h, s} | 77{h} | 777{sh} | 7775{shu} | | | |
| shua | 7{h, s} | 77{h} | 777{sh} | 7775{shu} | 77751{shua} | | |
| shuai | 7{h, s} | 77{h} | 777{sh} | 7775{shu} | 77751{shua} | 777514{shuai} | |
| shuan | 7{h, s} | 77{h} | 777{sh} | 7775{shu} | 77751{shua} | 777518{shuan} | |
| shuang | 7{h, s} | 77{h} | 777{sh} | 7775{shu} | 77751{shua} | 777518{shuan} | 7775181{shuang} |
| shuo | 7{h, s} | 77{h} | 777{sh} | 7775{shu} | 77752{shuo} | | |

TABLE 2-continued

The sequential coding and echoing for all legible PINYIN forms in
accordance with the present invention (ü is represented as v in the list)

| Target | Step 1 | Step 2 | Step 3 | Step 4 | Step 5 | Step 6 | Step 7 |
|---|---|---|---|---|---|---|---|
| shui | 7{h, s} | 77{h} | 777{sh} | 7775{shu} | 77754{shui} | | |
| shun | 7{h, s} | 77{h} | 777{sh} | 7775{shu} | 77758{shun} | | |
| hm | 7{h, s} | 77{h} | 778{hn, hm} | | | | |
| hng | 7{h, s} | 77{h} | 778{hn, hm} | 7781{hng} | | | |
| m | 8{n, m} | | | | | | |
| ma | 8{n, m} | 81{ma} | | | | | |
| mao | 8{n, m} | 81{ma} | 812{mao} | | | | |
| mai | 8{n, m} | 81{ma} | 814{mai} | | | | |
| man | 8{n, m} | 81{ma} | 818{man} | | | | |
| mang | 8{n, m} | 81{ma} | 818{man} | 8181{mang} | | | |
| mo | 8{n, m} | 82{mo} | | | | | |
| mou | 8{n, m} | 82{mo} | 825{mou} | | | | |
| me | 8{n, m} | 83{me} | | | | | |
| mei | 8{n, m} | 83{me} | 834{mei} | | | | |
| men | 8{n, m} | 83{me} | 838{men} | | | | |
| meng | 8{n, m} | 83{me} | 838{men} | 8381{meng} | | | |
| mi | 8{n, m} | 84{mi} | | | | | |
| miao | 8{n, m} | 84{mi} | 841{mia} | 8412{miao} | | | |
| mian | 8{n, m} | 84{mi} | 841{mia} | 8418{mian} | | | |
| miou | 8{n, m} | 84{mi} | 842{mio} | 8425{miou} | | | |
| mie | 8{n, m} | 84{mi} | 843{mie} | | | | |
| miu | 8{n, m} | 84{mi} | 845{miu} | | | | |
| min | 8{n, m} | 84{mi} | 848{min} | | | | |
| ming | 8{n, m} | 84{mi} | 848{min} | 8481{ming} | | | |
| mu | 8{n, m} | 85{mu} | | | | | |
| n | 8{n, m} | 88{n} | | | | | |
| ng | 8{n, m} | 88{n} | 881{ng, na} | | | | |
| na | 8{n, m} | 88{n} | 881{ng, na} | | | | |
| nao | 8{n, m} | 88{n} | 881{ng, na} | 8812{nao} | | | |
| nai | 8{n, m} | 88{n} | 881{ng, na} | 8814{nai} | | | |
| nan | 8{n, m} | 88{n} | 881{ng, na} | 8818{nan} | | | |
| nang | 8{n, m} | 88{n} | 881{ng, na} | 8818{nan} | 88181{nang} | | |
| nou | 8{n, m} | 88{n} | 882{no} | 8825{nou} | | | |
| nong | 8{n, m} | 88{n} | 882{no} | 8828{non} | 88281{nong} | | |
| ne | 8{n, m} | 88{n} | 883{ne} | | | | |
| nei | 8{n, m} | 88{n} | 883{ne} | 8834{nei} | | | |
| nen | 8{n, m} | 88{n} | 883{ne} | 8838{nen} | | | |
| neng | 8{n, m} | 88{n} | 883{ne} | 8838{nen} | 88381{neng} | | |
| ni | 8{n, m} | 88{n} | 884{ni} | | | | |
| nia | 8{n, m} | 88{n} | 884{ni} | 8841{nia} | | | |
| niao | 8{n, m} | 88{n} | 884{ni} | 8841{nia} | 88412{niao} | | |
| nian | 8{n, m} | 88{n} | 884{ni} | 8841{nia} | 88418{nian} | | |
| niang | 8{n, m} | 88{n} | 884{ni} | 8841{nia} | 88418{nian} | 884181{niang} | |
| niou | 8{n, m} | 88{n} | 884{ni} | 8842{nio} | 88425{niou} | | |
| nie | 8{n, m} | 88{n} | 884{ni} | 8843{nie} | | | |
| niu | 8{n, m} | 88{n} | 884{ni} | 8845{niu} | | | |
| nin | 8{n, m} | 88{n} | 884{ni} | 8848{nin} | | | |
| ning | 8{n, m} | 88{n} | 884{ni} | 8848{nin} | 88481{ning} | | |
| nu | 8{n, m} | 88{n} | 885{nu} | | | | |
| nuan | 8{n, m} | 88{n} | 885{nu} | 8851{nua} | 88518{nuan} | | |
| nuo | 8{n, m} | 88{n} | 885{nu} | 8852{nuo} | | | |
| nv | 8{n, m} | 88{n} | 886{nv} | | | | |
| nve | 8{n, m} | 88{n} | 886{nv} | 8863{nve} | | | |
| xi | 9{r, x} | 94{xi} | | | | | |
| xia | 9{r, x} | 94{xi} | 941{xia} | | | | |
| xiao | 9{r, x} | 94{xi} | 941{xia} | 9412{xiao} | | | |
| xian | 9{r, x} | 94{xi} | 941{xia} | 9418{xian} | | | |
| xiang | 9{r, x} | 94{xi} | 941{xia} | 9418{xian} | 94181{xiang} | | |
| xiou | 9{r, x} | 94{xi} | 942{xio} | 9425{xiou} | | | |
| xiong | 9{r, x} | 94{xi} | 942{xio} | 9428{xion} | 94281{xiong} | | |
| xie | 9{r, x} | 94{xi} | 943{xie} | | | | |
| xiu | 9{r, x} | 94{xi} | 945{xiu} | | | | |
| xin | 9{r, x} | 94{xi} | 948{xin} | | | | |
| xing | 9{r, x} | 94{xi} | 948{xin} | 9481{xing} | | | |
| xu | 9{r, x} | 95{xu} | | | | | |
| xuan | 9{r, x} | 95{xu} | 951{xua} | 9518{xuan} | | | |
| xue | 9{r, x} | 95{xu} | 953{xue} | | | | |
| xun | 9{r, x} | 95{xu} | 958{xun} | | | | |
| rao | 9{r, x} | 99{r} | 991{ra} | 9912{rao} | | | |
| ran | 9{r, x} | 99{r} | 991{ra} | 9918{ran} | | | |
| rang | 9{r, x} | 99{r} | 991{ra} | 9918{ran} | 99181{rang} | | |
| rou | 9{r, x} | 99{r} | 992{ro} | 9925{rou} | | | |
| rong | 9{r, x} | 99{r} | 992{ro} | 9928{ron} | 99281{rong} | | |
| re | 9{r, x} | 99{r} | 993{re} | | | | |

TABLE 2-continued

The sequential coding and echoing for all legible PINYIN forms in
accordance with the present invention (ü is represented as v in the list)

| Target | Step 1 | Step 2 | Step 3 | Step 4 | Step 5 | Step 6 | Step 7 |
|---|---|---|---|---|---|---|---|
| ren  | 9{r, x} | 99{r} | 993{re} | 9938{ren} | | | |
| reng | 9{r, x} | 99{r} | 993{re} | 9938{ren} | 99381{reng} | | |
| ri   | 9{r, x} | 99{r} | 994{ri} | | | | |
| ru   | 9{r, x} | 99{r} | 995{ru} | | | | |
| ruan | 9{r, x} | 99{r} | 995{ru} | 9951{rua} | 99518{ruan} | | |
| ruo  | 9{r, x} | 99{r} | 995{ru} | 9952{ruo} | | | |
| rui  | 9{r, x} | 99{r} | 995{ru} | 9954{rui} | | | |
| run  | 9{r, x} | 99{r} | 995{ru} | 9958{run} | | | |

TABLE 3

Permissible digit combinations and corresponding PINYIN forms in
accordance with the present invention (ü is represented as v in the list)

| | | | | |
|---|---|---|---|---|
| 1{g, z, a} | 2{d, b, o} | 3{y, j, e} | 4{k, c} | 5{t, p} |
| 6{w, q} | 7{h, s} | 8{n, m} | 9{r, x} | 0{l, f} |
| | 11{g, za} | 12{zo} | 13{ze} | 14{zi} |
| 15{zu} | 17{zh} | 10{a} | 21{ba} | 22{d, bo} |
| 23{be} | 24{bi} | 25{bu} | 20{o} | 33{y} |
| 34{ji} | 35{ju} | 30{e} | 41{ca} | 42{co} |
| 43{ce} | 44{k, ci} | 45{cu} | 47{ch} | 51{pa} |
| 52{po} | 53{pe} | 54{pi} | 55{t, pu} | 64{qi} |
| 65{qu} | 66{w} | 71{sa} | 72{so} | 73{se} |
| 74{si} | 75{su} | 77{h} | 81{ma} | 82{mo} |
| 83{me} | 84{mi} | 85{mu} | 88{n} | 94{xi} |
| 95{xu} | 99{r} | 01{fa} | 02{fo} | 03{fe} |
| 05{fu} | 00{l} | | 111{ga} | 112{go, zao} |
| 113{ge} | 114{zai} | 115{gu} | 118{zan} | 125{zou} |
| 128{zon} | 134{zei} | 138{zen} | 151{zua} | 152{zuo} |
| 154{zui} | 158{zun} | 177{zh} | 102{ao} | 104{ai} |
| 108{an} | 212{bao} | 214{bai} | 218{ban} | 221{da} |
| 222{do} | 223{de} | 224{di} | 225{du} | 234{bei} |
| 238{ben} | 241{bia} | 243{bie} | 248{bin} | 205{ou} |
| 331{ya} | 332{yo} | 333{ye} | 334{yi} | 335{yu} |
| 341{jia} | 342{jio} | 343{jie} | 345{jiu} | 348{jin} |
| 351{jua} | 353{jue} | 358{jun} | 304{ei} | 306{ev} |
| 308{en} | 309{er} | 412{cao} | 414{cai} | 418{can} |
| 425{cou} | 428{con} | 438{cen} | 441{ka} | 442{ko} |
| 443{ke} | 445{ku} | 451{cua} | 452{cuo} | 454{cui} |
| 458{cun} | 477{ch} | 512{pao} | 514{pai} | 518{pan} |
| 525{pou} | 534{pei} | 538{pen} | 541{pia} | 543{pie} |
| 548{pin} | 551{ta} | 552{to} | 553{te} | 554{ti} |
| 555{tu} | 641{qia} | 642{qio} | 643{qie} | 645{qiu} |
| 648{qin} | 651{qua} | 653{que} | 658{qun} | 661{wa} |
| 662{wo} | 663{we} | 665{wu} | 712{sao} | 714{sai} |
| 718{san} | 725{sou} | 728{son} | 738{sen} | 751{sua} |
| 752{suo} | 754{sui} | 758{sun} | 771{ha} | 772{ho} |
| 773{he} | 775{hu} | 777{sh} | 778{hn, hm} | 812{mao} |
| 814{mai} | 818{man} | 825{mou} | 834{mei} | 838{men} |
| 841{mia} | 842{mio} | 843{mie} | 845{miu} | 848{min} |
| 881{ng, na} | 882{no} | 883{ne} | 884{ni} | 885{nu} |
| 886{nv} | 941{xia} | 942{xio} | 943{xie} | 945{xiu} |
| 948{xin} | 951{xua} | 953{xue} | 958{xun} | 991{ra} |
| 992{ro} | 993{re} | 994{ri} | 995{ru} | 018{fan} |
| 025{fou} | 034{fei} | 038{fen} | 001{la} | 002{lo} |
| 003{le} | 004{li} | 005{lu} | 006{lv} | |
| 1112{gao} | 1114{gai} | 1118{gan} | 1125{gou} | 1128{gon} |
| 1134{gei} | 1138{gen} | 1151{gua} | 1152{guo} | 1154{gui} |
| 1158{gun} | 1181{zang} | 1281{zong} | 1381{zeng} | 1518{zuan} |
| 1771{zha} | 1772{zho} | 1773{zhe} | 1774{zhi} | 1775{zhu} |
| 1081{ang} | 2181{bang} | 2212{dao} | 2214{dai} | 2218{dan} |
| 2225{dou} | 2228{don} | 2234{dei} | 2238{den} | 2241{dia} |
| 2242{dio} | 2243{die} | 2245{diu} | 2248{din} | 2251{dua} |
| 2252{duo} | 2254{dui} | 2258{dun} | 2381{beng} | 2412{biao} |
| 2418{bian} | 2481{bing} | 3312{yao} | 3318{yan} | 3325{you} |
| 3328{yon} | 3348{yin} | 3351{yua} | 3353{yue} | 3358{yun} |
| 3412{jiao} | 3418{jian} | 3425{jiou} | 3428{jion} | 3481{jing} |
| 3518{juan} | 3081{eng} | 3099{er} | 4181{cang} | 4281{cong} |
| 4381{ceng} | 4412{kao} | 4414{kai} | 4418{kan} | 4425{kou} |
| 4428{kon} | 4434{kei} | 4438{ken} | 4451{kua} | 4452{kuo} |
| 4454{kui} | 4458{kun} | 4518{cuan} | 4771{cha} | 4772{cho} |

TABLE 3-continued

Permissible digit combinations and corresponding PINYIN forms in accordance with the present invention (ü is represented as v in the list)

| | | | | |
|---|---|---|---|---|
| 4773{che} | 4774{chi} | 4775{chu} | 5181{pang} | 5381{peng} |
| 5412{piao} | 5418{pian} | 5481{ping} | 5512{tao} | 5514{tai} |
| 5518{tan} | 5525{tou} | 5528{ton} | 5538{ten} | 5541{tia} |
| 5543{tie} | 5548{tin} | 5551{tua} | 5552{tuo} | 5554{tui} |
| 5558{tun} | 6412{qiao} | 6418{qian} | 6425{qiou} | 6428{qion} |
| 6481{qing} | 6518{quan} | 6614{wai} | 6618{wan} | 6634{wei} |
| 6638{wen} | 7181{sang} | 7281{song} | 7381{seng} | 7518{suan} |
| 7712{hao} | 7714{hai} | 7718{han} | 7725{hou} | 7728{hon} |
| 7734{hei} | 7738{hen} | 7751{hua} | 7752{huo} | 7754{hui} |
| 7758{hun} | 7771{sha} | 7772{sho} | 7773{she} | 7774{shi} |
| 7775{shu} | 7781{hng} | 8181{mang} | 8381{meng} | 8412{miao} |
| 8418{mian} | 8425{miou} | 8481{ming} | 8812{nao} | 8814{nai} |
| 8818{nan} | 8825{nou} | 8828{non} | 8834{nei} | 8838{nen} |
| 8841{nia} | 8842{nio} | 8843{nie} | 8845{niu} | 8848{nin} |
| 8851{nua} | 8852{nuo} | 8863{nve} | 9412{xiao} | 9418{xian} |
| 9425{xiou} | 9428{xion} | 9481{xing} | 9518{xuan} | 9912{rao} |
| 9918{ran} | 9925{rou} | 9928{ron} | 9938{ren} | 9951{rua} |
| 9952{ruo} | 9954{rui} | 9958{run} | 0181{fang} | 0381{feng} |
| 0012{lao} | 0014{lai} | 0018{lan} | 0025{lou} | 0028{lon} |
| 0034{lei} | 0038{len} | 0041{lia} | 0042{lio} | 0043{lie} |
| 0045{liu} | 0048{lin} | 0051{lua} | 0052{luo} | 0058{lun} |
| 0063{lve} | | 11181{gang} | 11281{gong} | 11381{geng} |
| 11514{guai} | 11518{guan} | 17712{zhao} | 17714{zhai} | 17718{zhan} |
| 17725{zhou} | 17728{zhon} | 17734{zhei} | 17738{zhen} | 17751{zhua} |
| 17752{zhuo} | 17754{zhui} | 17758{zhun} | 22181{dang} | 22281{dong} |
| 22381{deng} | 22412{diao} | 22418{dian} | 22425{diou} | 22481{ding} |
| 22518{duan} | 33181{yang} | 33281{yong} | 33481{ying} | 33518{yuan} |
| 34181{jiang} | 34281{jiong} | 44181{kang} | 44281{kong} | 44381{keng} |
| 44514{kuai} | 44518{kuan} | 47712{chao} | 47714{chai} | 47718{chan} |
| 47725{chou} | 47728{chon} | 47738{chen} | 47751{chua} | 47752{chuo} |
| 47754{chui} | 47758{chun} | 55181{tang} | 55281{tong} | 55381{teng} |
| 55412{tiao} | 55418{tian} | 55481{ting} | 55518{tuan} | 64181{qiang} |
| 64281{qiong} | 66181{wang} | 66381{weng} | 77181{hang} | 77281{hong} |
| 77381{heng} | 77514{huai} | 77518{huan} | 77712{shao} | 77714{shai} |
| 77718{shan} | 77725{shou} | 77734{shei} | 77738{shen} | 77751{shua} |
| 77752{shuo} | 77754{shui} | 77758{shun} | 88181{nang} | 88281{nong} |
| 88381{neng} | 88412{niao} | 88418{nian} | 88425{niou} | 88481{ning} |
| 88518{nuan} | 94181{xiang} | 94281{xiong} | 99181{rang} | 99281{rong} |
| 99381{reng} | 99518{ruan} | 00181{lang} | 00281{long} | 00381{leng} |
| 00412{liao} | 00418{lian} | 00425{liou} | 00481{ling} | 00518{luan} |
| | 115181{guang} | 177181{zhang} | 177281{zhong} | 177381{zheng} |
| 177514{zhuai} | 177518{zhuan} | 445181{kuang} | 477181{chang} | 477281{chong} |
| 477381{cheng} | 477514{chuai} | 477518{chuan} | 775181{huang} | 777181{shang} |
| 777381{sheng} | 777514{shuai} | 777518{shuan} | 884181{niang} | 004181{liang} |
| | 1775181{zhuang} | 4775181{chuang} | 7775181{shuang} | |

What is claimed is:

1. A method of delineating a Chinese PINYIN form with few symbols comprising steps of:

(a) dividing elementary PINYIN symbols into coding groups included in a lookup table;
(b) associating each coding group with a coding symbol;
(c) differentiating elements within said coding group with a coding symbol or a string of coding symbols;
(d) converting the elementary symbols within said Chinese PINYIN form sequentially into said coding symbol or said string of coding symbols; and
(e) rendering said coding symbol within a string of coding symbols achieved by said converting method sequentially to a unique PINYIN element;

whereby said Chinese PINYIN form is delineated by few coding symbols of said coding symbols, and the string of said delineated coding symbols is uniquely correlated to the original Chinese PINYIN form; and wherein the lookup table contains PINYIN symbols in either Romania form or classic Chinese form of 20 elementary initial consonants, 6 elementary vowels and 4 tones, and the elementary symbols have been divided into 10 coding-groups or coding set by means of:

each set contains one double coding consonant item, one single coding consonant item and an additional coding vowel or tone item;

each set is associated with a coding symbol or a digit;

an individual PINYIN element is coded by its coding symbol except for that:

said double coding consonant item is coded by the double coding symbol;

said additional coding vowel item is coded by its coding symbol plus a different coding symbol when said additional coding vowel appears at the initial position of a PINYIN form, whereby said Chinese PINYIN symbol in either Romania style or classic style is converted to a coding symbol or a string of coding symbols, which is uniquely correlated to its original PINYIN symbol during the sequential delineating process.

2. The method of claim 1, wherein (a) said double coding consonants are "g", "k", "h", "d", "t", "n", "l", "y", "w", "r" or in their conventional style; (b) said single coding consonants are "z", "c", "s", "b", "p", "m", "f", "j", "q", "x" or in their conventional style; (c) said additional coding items are vowels "a", "o", "e", "i", "u", "ü" or in their conventional style and tones "¯", "/", "V", "\"; 4`) said lookup table comprises at least:

the coding set 1 contains "g", "z" and "a" or in their conventional style "ㄍ", "ㄗ" and "ㄚ" with digit identification 1;

the coding set 2 contains "d", "b" and "o" or in their conventional style "ㄉ", "ㄅ" and "ㄛㄅㄜ" with digit identification 2;

the coding set 3 contains "y", "j" and "e" or in their conventional style "一", "ㄐ" and "ㄝ" with digit identification 3;

the coding set 4 contains "k", "c" and "i" or in their conventional style "ㄎ", "ㄘ" and "¯" with digit identification 4;

the coding set 5 contains "t", "p" and "u" or in their conventional style "ㄊ", "ㄆ" and "ㄨ" with digit identification 5;

the coding set 6 contains "w", "q" and "ü" or in their conventional style "ㄨ", "ㄑ" and "ㄩ" with digit identification 6;

the coding set 7 contains "h", "s" and "´ " or in their conventional style "ㄏ", "ㄙ" and "´ " with digit identification 7;

the coding set 8 contains "n", "m" and "" or in their conventional style "ㄋ", "ㄇ" and "˘" with digit identification 8;

the coding set 9 contains "r", "x" and "`" or in their conventional style "ㄖ", "ㄒ" and "`" with digit identification 9;

the coding set 10 contains "l", "f" and "¯" or in their conventional style "ㄌ", "ㄈ" and "¯" with digit identification 0.

3. The method of claim 1, wherein a table with 3 columns and 4 rows or 4 columns and 3 rows are formed corresponding to the keys in a keypad including:

the cells of the table are filled with contents of the coding sets of the lookup table; and the coding symbols of PINYIN elements being in the same column or row respectively whenever the PINYIN elements are from a same PINYIN phonetic group comprising {g, k, h}, {j, q, x}, {z, c, s}, {b, p, m, f}, {d, t, n, l}, {i, u, u}, {a, o, e}, {y, w, r} respectively, whereby the order of the PINYIN elements within the lookup table is consistent with the phonetic group of PINYIN elements.

4. A method for encoding PINYIN symbol with coding symbol sub group identification and decoding the coded PINYIN elements comprising:

a. receiving encoded PINYIN symbols sequentially by key presses from an electronic device of at least 10 keys in either 4*3 or 3*4 matrix wherein the keys of the electronic device are mapped by the coding table as recited in claim 3;

b. setting potential PINYIN forms according to an initial code;

c. whenever the second code occurs, fixing the initial code as either the double coding consonant item, single coding consonant item, or vowel initial item respectively, and further decoding the second code whenever necessary;

d. decoding the coded PINYIN symbols sequentially into a nominated PINYIN element with one of "a", "o", "e", "u", "u" or "h", "n", and "g" respectively;

e. whenever an exception which is said nominated PINYIN element interrupting a proper elongation a partial PINYIN form occurs, re-decoding the coding symbol as an initial code;

f. appending said nominated PINYIN element to the existing partial PINYIN form;

g. checking a tentative PINYIN form created by the existing partial PINYIN form elongated with the nominated PINYIN element against a list of legible PINYIN forms; if there is a match, the tentative PINYIN form is the decoded PINYIN form, otherwise, the existing partial PINYIN form is the decoded PINYIN form.

* * * * *